US009672146B2

(12) United States Patent
Kozlovsky et al.

(10) Patent No.: US 9,672,146 B2
(45) Date of Patent: Jun. 6, 2017

(54) RETRIEVEING DATA FROM DATA STORAGE SYSTEMS

(75) Inventors: Vitaly Stanislavovich Kozlovsky, St. Petersburg (RU); Mikhail Aleksandrovich Ilyin, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 768 days.

(21) Appl. No.: 13/813,825

(22) PCT Filed: Mar. 29, 2011

(86) PCT No.: PCT/RU2011/000196
§ 371 (c)(1),
(2), (4) Date: Feb. 1, 2013

(87) PCT Pub. No.: WO2012/134318
PCT Pub. Date: Oct. 4, 2012

(65) Prior Publication Data
US 2013/0132657 A1    May 23, 2013

(51) Int. Cl.
| G06F 12/00 | (2006.01) |
| G06F 13/00 | (2006.01) |
| G06F 12/02 | (2006.01) |
| G06F 17/30 | (2006.01) |
| G06F 11/07 | (2006.01) |
| G06F 11/14 | (2006.01) |

(52) U.S. Cl.
CPC ........ G06F 12/0246 (2013.01); G06F 11/079 (2013.01); G06F 17/30 (2013.01); G06F 11/1417 (2013.01)

(58) Field of Classification Search
USPC .......................... 711/115; 714/6.1, 6.11, 42
See application file for complete search history.

(56) References Cited

U.S. PATENT DOCUMENTS

| 4,787,060 A * | 11/1988 | Boudreau ............ G06F 11/006 711/115 |
| 5,339,408 A * | 8/1994 | Bruckert ................ G06F 1/12 714/11 |
| 6,732,301 B1 * | 5/2004 | Landry ................ G06F 11/267 710/110 |
| 7,502,904 B2 * | 3/2009 | Furuhashi ........... G06F 11/1076 709/226 |
| 7,690,030 B1 * | 3/2010 | Ma et al. ......................... 726/9 |
| 7,979,759 B2 * | 7/2011 | Carnevale ............... G11C 5/04 365/201 |
| 8,621,118 B1 * | 12/2013 | Nulkar .................... G06F 11/26 710/15 |
| 2003/0005336 A1 * | 1/2003 | Poo et al. ...................... 713/202 |

(Continued)

FOREIGN PATENT DOCUMENTS

IN    WO 2015166510 A1 *  11/2015 ........... G06F 11/006

*Primary Examiner* — Sean D Rossiter
(74) *Attorney, Agent, or Firm* — Krishnendu Gupta; Jason A. Reyes; Deepika Bhayana

(57) ABSTRACT

A method is used in retrieving data from data storage systems. A nonvolatile memory module connected to a data storage system is detected. The data storage system uses information stored in the nonvolatile memory module to initiate an action. Based on the information, the action is performed. The action includes retrieving data from the data storage system to the nonvolatile memory module.

20 Claims, 9 Drawing Sheets

(56) References Cited

U.S. PATENT DOCUMENTS

| | | | |
|---|---|---|---|
| 2003/0233601 A1* | 12/2003 | Vaid | G06F 11/3648 714/42 |
| 2004/0107395 A1* | 6/2004 | Volkerink | G01R 31/31705 714/732 |
| 2007/0174749 A1* | 7/2007 | Jaworski | G07C 5/085 714/727 |
| 2009/0049341 A1* | 2/2009 | Cases | G06F 11/24 714/39 |
| 2010/0293201 A1* | 11/2010 | Thergaonkar et al. | 707/803 |
| 2011/0029816 A1* | 2/2011 | Perng | G06F 11/2284 714/36 |
| 2011/0208700 A1* | 8/2011 | Noble | 707/638 |
| 2012/0023374 A1* | 1/2012 | Ohnishi | G06F 12/0804 714/42 |
| 2014/0157059 A1* | 6/2014 | Hosotani | G11C 29/38 714/42 |
| 2015/0074450 A1* | 3/2015 | Blount | G06F 11/0727 714/6.1 |
| 2015/0269017 A1* | 9/2015 | Ellis | G06F 11/0793 714/42 |
| 2016/0140007 A1* | 5/2016 | Cho | G06F 11/263 714/42 |

* cited by examiner

RETRIEVEING DATA FROM DATA STORAGE SYSTEMS

BACKGROUND

Technical Field

This application relates to retrieving data from data storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Computers, computer networks, and other computer-based systems are becoming increasingly important as part of the infrastructure of everyday life. Networks are used for sharing peripherals and files. In such systems, complex components are the most common sources of failure or instability. The proliferation of multiple interacting components leads to problems that are difficult or impossible to predict or prevent. The problems are compounded by the use of networks, which introduce the added complexity of multiple machines interacting in obscure and unforeseen ways.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable so that critical data is not lost or unavailable. Additionally, in case of a failure in such storage systems, it is critical that cause of the failure is investigated in a timely manner for preventing further failures in such storage systems.

Different tasks may be performed in connection with a data storage system. For example, software may be executed on the data storage system in connection with performing data storage administration tasks such as for data storage configuration, management, and/or monitoring. Monitoring of a data storage system includes analyzing health of the data storage system and investigating cause of a failure in the data storage system when the data storage system fails to function successfully. Monitoring of a data storage system is performed by services such as a data collection service, a configuration service and a performance analyzer service. The data collection service gathers logs of the storage system ("system logs"), snapshots of the data storage system's memory, configuration and status information of the data storage system. Information collected by the data collection service may be stored on a storage device connected to the data storage system and may be retrieved later. Information stored on the storage device is then analyzed by storage experts for investigating cause of a failure in the data storage system. Generally, a remote user interface such as a graphical user interface (GUI) and a command line interface (CLI) is used for retrieving information from the data storage system. However, it may be difficult or impossible to retrieve information from the data storage system when a connection between the remote user interface and the data storage system is broken or the data storage system stops responding to commands issued from the remote user interface.

SUMMARY OF THE INVENTION

A method is used in retrieving data from data storage systems. A nonvolatile memory module connected to a data storage system is detected. The data storage system uses information stored in the nonvolatile memory module to initiate an action. Based on the information, the action is performed. The action includes retrieving data from the data storage system to the nonvolatile memory module.

BRIEF DESCRIPTION OF THE DRAWINGS

Features and advantages of the present invention will become more apparent from the following detailed description of exemplary embodiments thereof taken in conjunction with the accompanying drawings in which.

Figure 1:
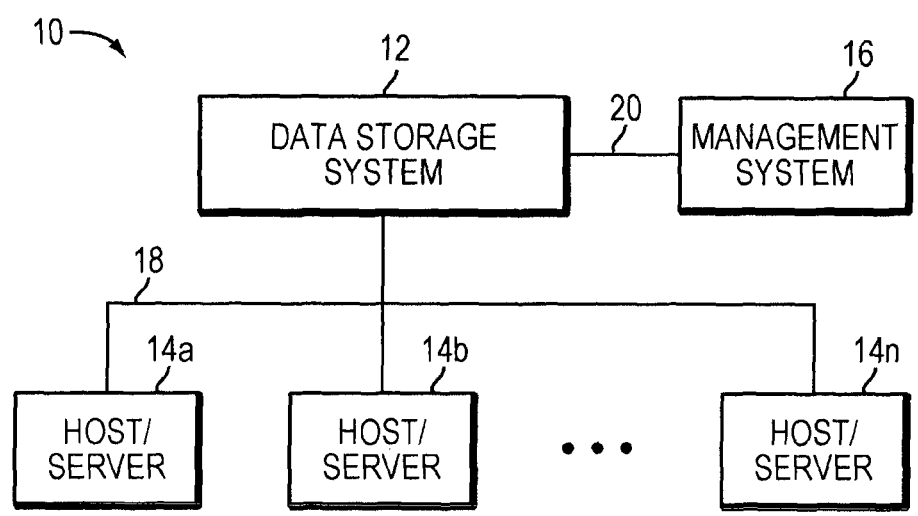
FIG. 1 is an example of an embodiment of a computer system that may utilize the techniques described herein.

DETAILED DESCRIPTION OF
EMBODIMENT(S)

Described below is a technique for use in retrieving data from data storage systems, which technique may be used to provide, among other things, detecting a nonvolatile memory module connected to a data storage system, using information stored in the nonvolatile memory module to initiate an action on the data storage system, and based on the information, performing the action of retrieving data from the data storage system to the non-volatile memory module.

Conventionally, when a data storage system fails to perform an operation or a command, diagnostic information such as system logs, logs of components of the data storage system, configuration and status information of the data storage system, memory dumps and memory snapshots of failed processes in the storage system is collected by a data collection service. Conventionally in such a system, the data collection service stores the diagnostic information in a location specified by a user or an administrator of the data storage system. Conventionally in such a case, the user or the administrator of the data storage system retrieves the diagnostic information collected by the data collection service by issuing a command to the data storage system from a remote user interface (e.g., GUI, CLI) of a host system. The remote user interface interacts with the data storage system via a network connection. However, in such a conventional case, when the data storage system stops responding to commands issued from the remote user interface of the host system due to a problem in the network connection or a problem on the data storage system, the diagnostic information may not be retrieved at all from the data storage system. Conventionally in such a case, the user may need to take a drastic measure such as disassembling the data storage system for investigating cause of a failure in the data storage system. Conventionally in such a case, diagnostic information may only be retrieved from the data storage system by replacing a hardware component causing the failure in the data storage system. For example, in such a conventional case, if a network card is damaged causing a problem in the network connection, the network card must be replaced to enable the communication between the remote user interface and the data storage system. In such a conventional case, diagnostic data can be retrieved from the data storage system only after replacing the network card. Further, for example, in such a conventional case, if a failure such as overflow of disk space occurs in the data storage system, an additional disk space must be added to the data storage system to store diagnostic information. Further, in such a conventional case, the additional disk space may be needed by the data collection service as a temporary storage. In such a conventional case, adding the additional disk space may not be possible without shutting down the data storage system. As a result, in such a conventional case, valuable information such as information stored in a system cache of the data storage system may be lost when the data storage system is powered down for adding the additional disk space. Therefore in such a conventional case, some of the diagnostic information such as information stored in the system cache may never be retrieved at all. Additionally, in such a conventional case, a storage system expert's help may be required to retrieve diagnostic information.

By contrast, in at least some implementations in accordance with the technique as described herein, information stored on a nonvolatile memory module helps cause initiation of an action on the data storage system when the nonvolatile memory module is connected to the data storage system and based on the information, data is retrieved from the data storage system to the nonvolatile memory module even when the data storage system stops responding to a command from a remote user interface. In at least one data storage system implementation as described herein, use of the nonvolatile memory module that may include information initiating automatic retrieval of information from the data storage system provides uninterrupted access to diagnostic data that may help in investigating cause of a failure in the data storage system. In at least some implementations in accordance with the technique as described herein, the nonvolatile memory module includes a marker file that stores information regarding an action that is initiated on the data storage system.

In at least some implementations in accordance with the technique as described herein, the use of the retrieving data from data storage systems technique can provide one or more of the following advantages: improving data storage system reliability by retrieving data from a failed data storage system, increasing system availability by communicating with a non-responsive data storage system, improving system performance by using diagnostic information retrieved from the data storage system to align and tune system settings optimally, and eliminating or reducing the need to disassemble the failed data storage by retrieving information from the data storage system when the data storage system stops responding to a request from a remote user interface.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18.

Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with retrieving data from the data storage system in connection with techniques described herein.

In connection with an embodiment in which the data storage 12 is an appliance including hardware and software, the appliance may also include other software for performing different data services. For example, the appliance may include a data collection service which interacts with software on the hosts 14a-14n when performing a data collection operation on the data storage system 12.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for retrieving data from the data storage system.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2:
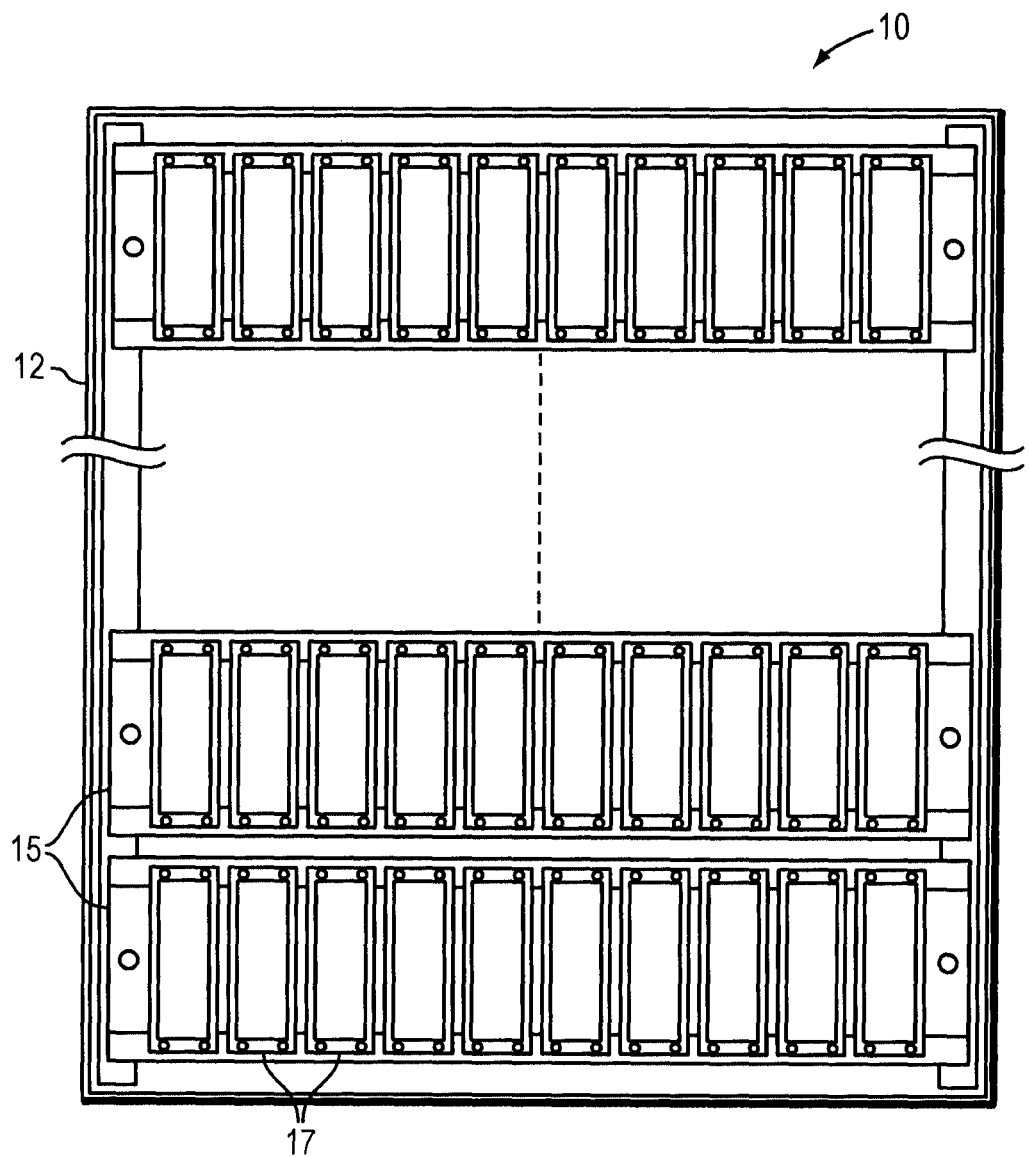
FIG. 2 is a representation of a rack mount system including several storage enclosures and is an example of an embodiment of a computer system that may utilize the techniques described herein.

Referring to FIG. 2, shown is an example of an embodiment of a computer system 10 that may be used in connection with performing the technique or techniques described herein. A rack mount cabinet 12 includes several storage enclosures 15. Each storage enclosure 15 includes several disk drives 17. The disk drives and the enclosures are preferably interconnected via a serial bus loop or ring architecture, e.g., Fibre Channel Arbitrated Loop (FC-AL).

Figure 3:
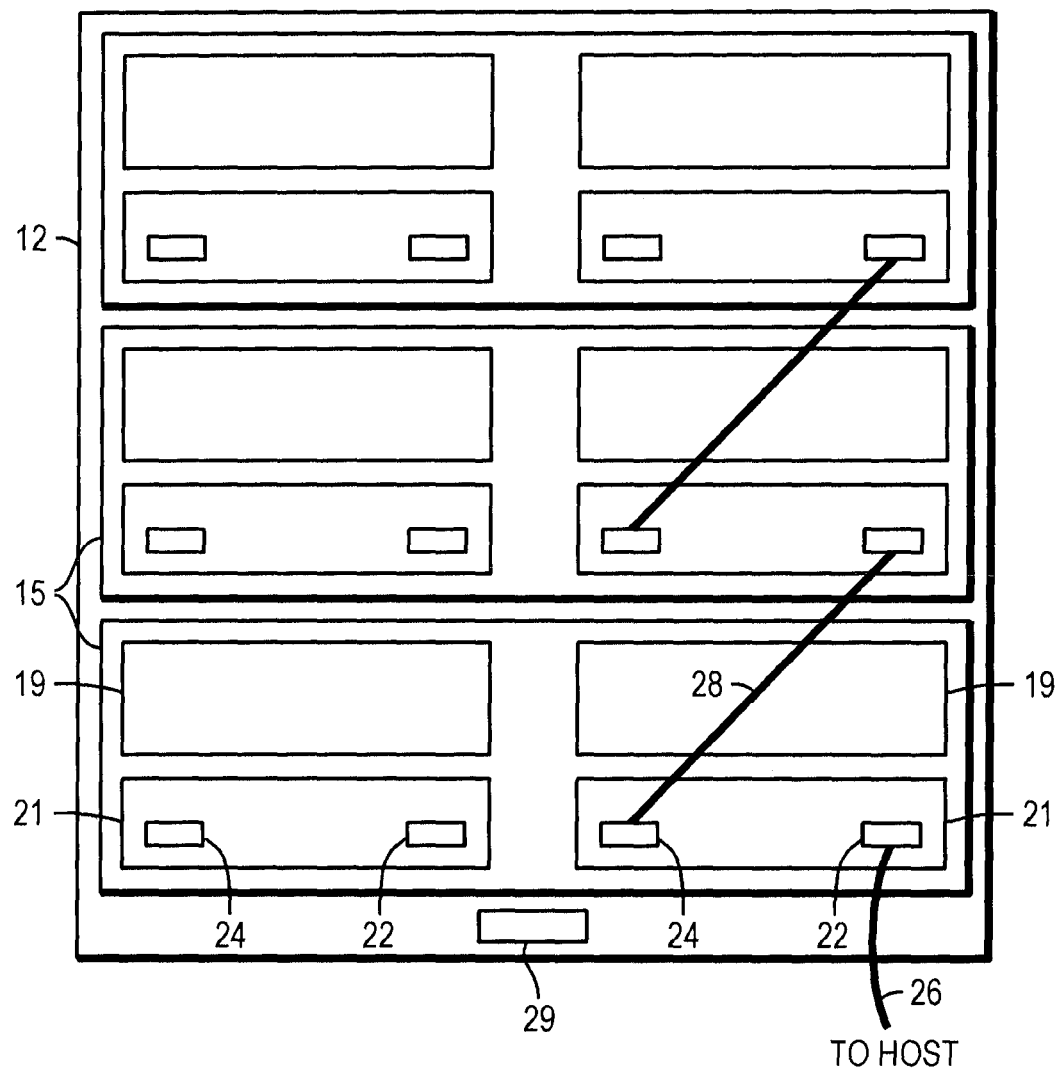
FIG. 3 is a rear view of the rack mount system and storage enclosures of FIG. 2.

Referring to FIG. 3, shown is a rear view of the rack mount cabinet 12 and the storage enclosure 15. Each storage enclosure includes two power supplies 19, and two LCCs 21. The power supplies 19 and link control cards (LCC) 21 are coupled to the disk drives 17 via a midplane within the chassis (not shown in FIG. 2). The link control card 21 serves to interconnect the disks and enclosures on the communication loop FC-AL.

Each link control card 21 includes a primary port 22 and an expansion port 24. These ports are used to link the storage enclosures together on a single communication loop FC-AL. A cable 26 may come from a host or from another storage system, and plugs into the primary port 22. The communication loop FC-AL extends from the primary port 22, is coupled to the disk drives 17, and continues out the expansion port 24. A cable 28 couples the expansion port 24 of a first storage enclosure 15 to the primary port 22 of a second storage enclosure 15. All the storage enclosures 15 are interconnected in this manner in a daisy chain to form the communication loop FC-AL. Thus, all the disk drives 17 are interconnected on the same communication loop. FC-AL. Each link control card 21 is capable of controlling all the disks 17 in a given enclosure.

Referring again to FIG. 3, the data storage system 12 includes a peripheral device connector 29 that allows stand-alone peripheral devices to be connected to the data storage system 12. The peripheral device connector 29 (also referred to herein as simply "connector") may use a Universal Serial Bus (USB) interface. A stand-alone peripheral device that connects to the connector 29 may include a nonvolatile memory module such as a USB drive. A USB drive may include a flash memory data storage device integrated with a USB (Universal Serial Bus) interface. Further, in one embodiment of the current technique, a USB drive may include a USB flash drive. A USB drive may generally be removed from the connector 29 and data on the USB drive may be rewritten. A USB drive implements a USB mass storage standard protocol so that operating systems running on a modern computer system can read and write to the USB drive without installing device drivers on the USB drive. The USB drive presents a simple block-structured logical unit to a host operating system running on the computer system, hiding the individual complex implementation details of the various underlying flash memory devices. The host operating system can use any file system or block addressing scheme to read data from the USB drive or write data to the USB drive. The computer system may also boot up from the USB drive.

In at least some implementations in accordance with the technique as described herein, a USB drive may include a small printed circuit board carrying the circuit elements and a USB connector, insulated electrically and protected inside a plastic, metal, or rubberized case which can be carried in a pocket or on a key chain, for example. Further, the USB connector may be protected by a removable cap or by retracting into the body of the drive, although it is not likely to be damaged if unprotected. Additionally, a USB drive may use a standard type-A USB connection allowing plugging into a port on a personal computer or a data storage system, but drives for other interfaces may also be used. A data storage system accesses flash memory devices much as hard disk drives are accessed. A USB drive may also include components such as an LED display. The LED display on the USB drive indicates status of data transfers, data reads and data writes occurring on the USB drive.

With wide deployment of USB drives such as USB flash drives being used in various environments (secured or otherwise), the issue of data and information security remains important. Additionally, as a highly portable media, USB flash drives are easily lost or stolen. In at least some embodiments of the current technique, a secure USB drive may use a hardware-based or a software-based encryption mechanism for encrypting data stored on the secure USB drive.

USB drives are particularly useful among system and network administrators, who load the USB drives with configuration information and software used for system maintenance, troubleshooting, and recovery. USB drives may also be used as a means to transfer information from a data storage system to a remote computer for investigating cause of a failure in the data storage system. Data stored on USB drives is impervious to scratches and dust, and USB drives are mechanically robust making them suitable for transporting data from one place to another place and keeping the data readily accessible.

It should be noted that the nonvolatile memory module may include any other kind of a peripheral device in addition to or other than a USB drive that is capable of connecting to the data storage system and includes sufficient memory to store data retrieved from the data storage system.

In at least some embodiments of the current technique, even a user with no or minimal knowledge of data storage systems can retrieve data from the data storage system by using a nonvolatile memory module such as a specially configured USB drive if the user is provided with a set of simple instructions indicating how to connect the nonvolatile memory module to the data storage system. Data retrieved on the nonvolatile memory module is then sent to a data storage system expert who analyzes the data in a specially configured environment to investigate a failure in the data storage system.

Figure 4:
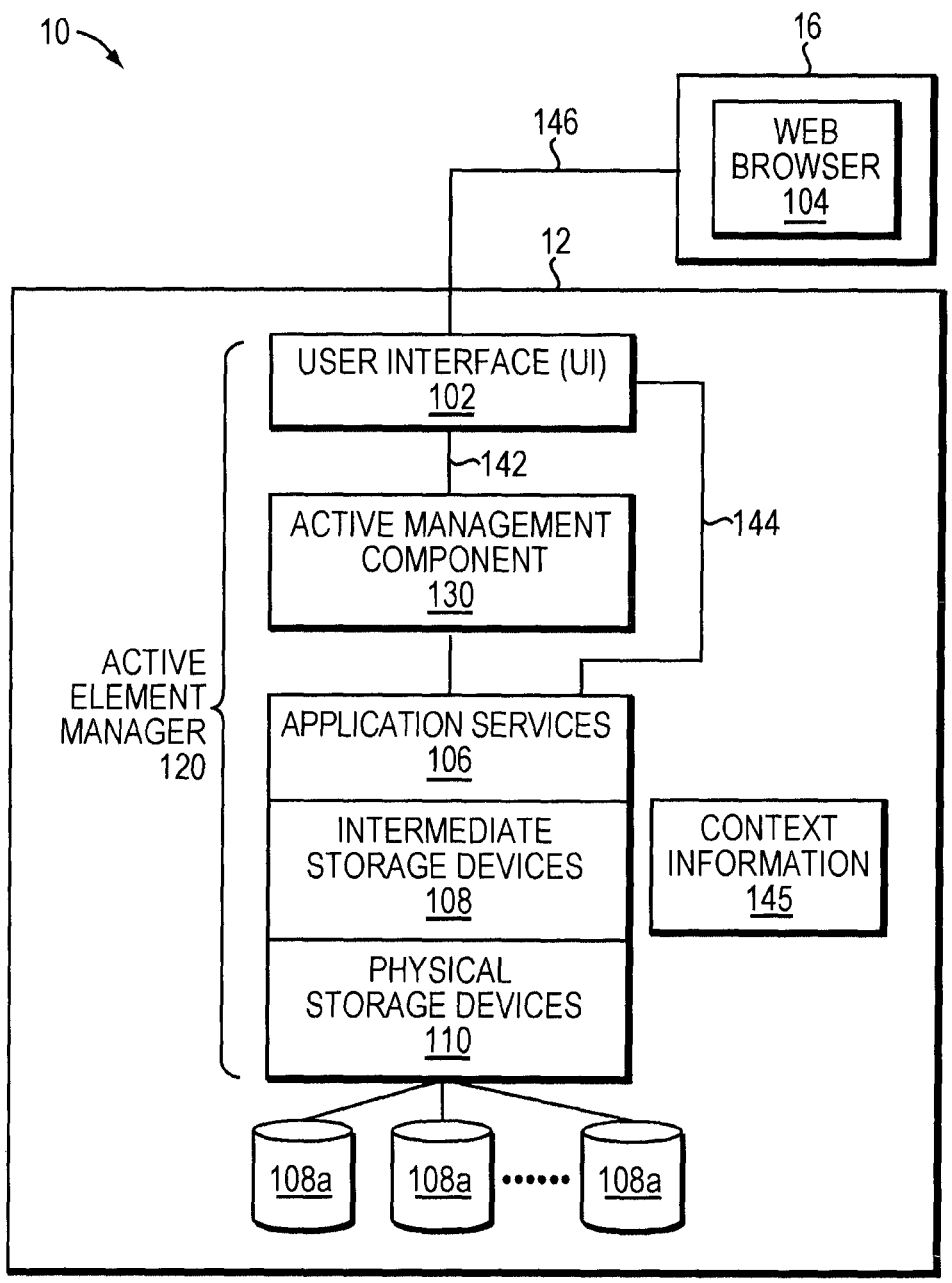
FIGS. 4-6 are diagrams illustrating in more detail components that may be used in connection with techniques herein.

Referring to FIG. 4, shown is an example of components that may be included on the data storage system 12 and the management system 16. The management system 16 may include a web browser 104 which is used when communicating with active element manager (AEM) 120 of the data storage system 12. The AEM 120 may be used to perform operations in connection with management, configuration, data collection, monitoring, and the like, of the data storage system 12. For example, the AEM 120 may be used to provision storage used by any one or more different applications such as an email application, a database application, and file server, and the like. As described herein, the AEM 120 may also be used to facilitate interactions with environments and locations external to the data storage system 12 and management system 16, such as other computer network locations. In other words, the AEM 120 may be used to facilitate communications with other locations and environments external with respect to the data storage system environment in which the data storage system environment may include, for example, one or more data storage systems 12, the management system 16, a SAN, and the like.

The AEM 120 includes a user interface (UI) 102, an active management component 130, and one or more layers or levels of services, such as 106, 108 and 110, in connection with implementing a data storage request such as a data storage configuration request and a data collection request.

The user interface (UI) 102 may provide for one or more different types of user interfaces and associated data. For example, the UI 102 may provide support for a remote user interface such as a graphical user interface (GUI), a command line interface (CLI), and the like, to support interactions between the data storage system 12 and the hosts 14a-14n of FIG. 1. The UI 102 may interact with other components on the data storage system in connection with communicating with a user. For example, the UI 102 may provide UI data (e.g., content or data used to populate the UI menus), and UI presentation or structure information (e.g., command organization or particular hierarchical menu structure) to another component such as the web browser 104 in connection with interacting with the user.

The active management component 130 may be used in connection with facilitating communications between the UI 102 and the different service layers 106, 108 and 110 when performing active element management operations. Active element management operations may be characterized as those involving interactions with environments and locations external to the data storage system environment. Such external environments and locations may include, for example, other network locations and websites as described elsewhere herein. The active management component 130 may facilitate a two-way communication flow of information to and/or from the external environments. The active management component 130 may gather context information 145 describing the current context and state of the data storage system with respect to the current user and operation being performed. The active management component 130 may gather such information included in 145 by communicating with other components on the data storage system 12, such as one or more of the service layers 106, 108 and 110. The component 130 may communicate the context information 145 to a target location in an external environment such as a target network location on the Internet. The component 130 may facilitate selecting, in accordance with the context information 145 of the data storage system, a target location in the external environment, such as an Internet website, and communicating the context information directly to the target location. The component 130 may also be used to facilitate communicating information received from the target location to the user.

Referring again to FIG. 4, in the example 10, the active management component 130 is represented as a single logical component. However, an embodiment may integrate the operations and functionality of the component 130 in the UI 102 and/or other components included in the AEM 120.

It should be noted that there are two paths 142 and 144 illustrated in FIG. 4. The path 142 may be used in connection with those operations involving interactions with environments external to the data storage system. The path 144 may be used when performing operations that do not involve such interactions with environments external to the data storage system 12 and management system 16. For example, the path 144 may be used in connection with performing a data storage configuration request issued by a user from the management system 16. The path 142 may be utilized if an operation or condition occurs involving the active management component 130 such as when the user requests connection to a website on the Internet for additional information and assistance with respect to an error that occurred as a result of the data storage configuration request.

Referring again to FIG. 4, in the example 10, the AEM 120 may include application services 106, intermediate or generic storage services 108, and physical storage services 110. In one embodiment, the user may interact with the UI communicating directly with any one of the different services 106, 108 and 110. In other words, a user may communicate directly with layer 106, 108 or 110. If a user provides an input request and/or data by directly communicating with one of the upper service layers, such as 106, the user request and/or data may be mapped to one or more lower service requests, such as by services of 106 communicating with services of 108 and/or 110 to implement the original input request. By connecting to the different service layers 106, 108 and 110, the UI may provide the user with exposure to different levels of abstraction in connection with performing data storage system management tasks. In one embodiment as described in more detail below, the different service layers may be in accordance with different levels of proficiency and knowledge with respect to performing data storage system management tasks for different applications.

The application services 106 may have an application-specific focus and provide a level of abstraction customized for an application such as, for example, a particular email application, law office application or medical office application, as well as a class of related applications, such as multiple email applications. The application services layer 106 may map the user provided inputs for use by the intermediate storage services 108.

The physical storage services 110 provide the most detailed or greatest level of exposure of the underlying data storage system. The physical storage services 110 may be customized for the particular storage vendor and associated options. The user interface for a user connected at to the physical storage services may include menu options and terms particular to the underlying storage vendor and the more knowledgeable user. For example, the user may specify particular devices, RAID levels and techniques, file types, SCSI and iSCSI terminology, and the like.

It should be noted that the example 10 in FIG. 4 is one possible embodiment of the components used in connection with the techniques herein. As illustrated in FIG. 4, the AEM 120 is included in the data storage system. In another embodiment using the techniques herein, the AEM 120 may be installed and execute on a host or other component connected to the data storage system. In yet another embodiment portions of the AEM 120, such as the UI 102 and/or one or more of the services 106, 108, 110 may be installed and execute on a host or other component connected to the data storage system.

Figure 5:
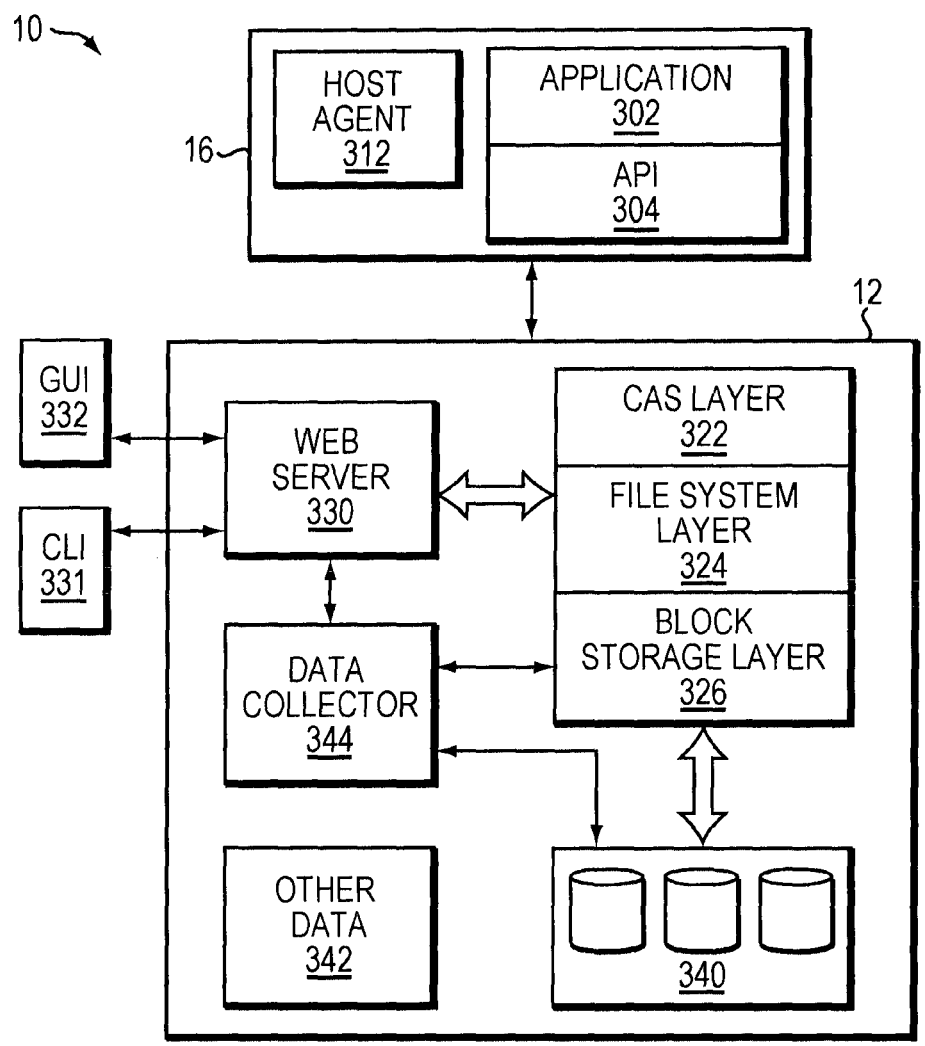

Referring to FIG. 5, shown is an example of an embodiment of a host communicating with a data storage system in accordance with techniques herein. With reference also to FIG. 4, the example 10 includes a host 14 and a data storage system 12. The host 14 may include one or more applications 302, an API (application programming interface) 304, and host agent 312. The data storage system 12 may include a web server 330, storage devices 340, and software executing thereon comprising CAS layer 322, file system layer 324 and block storage layer 326. GUI 332 may correspond to one type of UI represented by element 102 of FIG. 4 and CLI 331 may corresponds to another type of UI represented by element 102 of FIG. 4. The GUI 332 may provide functionality as described herein so that a user may interact with the data storage system 12 when performing data storage operations, such as data collection requests.

The GUI 332 may communicate with the web server 330 of the data storage system in connection with a request such as to retrieve diagnostic information for analyzing health of the data storage system 12 and for investigating cause of a failure in the data storage system 12. The web server 330 may communicate with data collector 344 that may further communicate (directly and/or indirectly) with one or more other layers of software 322, 324 and 326 executing on the data storage system in connection with performing the request, such as to collect diagnostic information. Additionally, data collector utility 344 communicates with operating system and other utilities 351 of data storage system for logging diagnostic information pertinent to components of the operating system and utilities executing on the data storage system. The web server 330 and/or other software executing on the data storage system 320 may also access other data 342 (e.g., configuration data, status, and the like) in connection with performing processing described herein. The host agent 312 may be software executing on the host 310. The host agent 312 may, for example, communicate with the GUI 332 in connection with issuing a command to data storage system 12.

Figure 6:
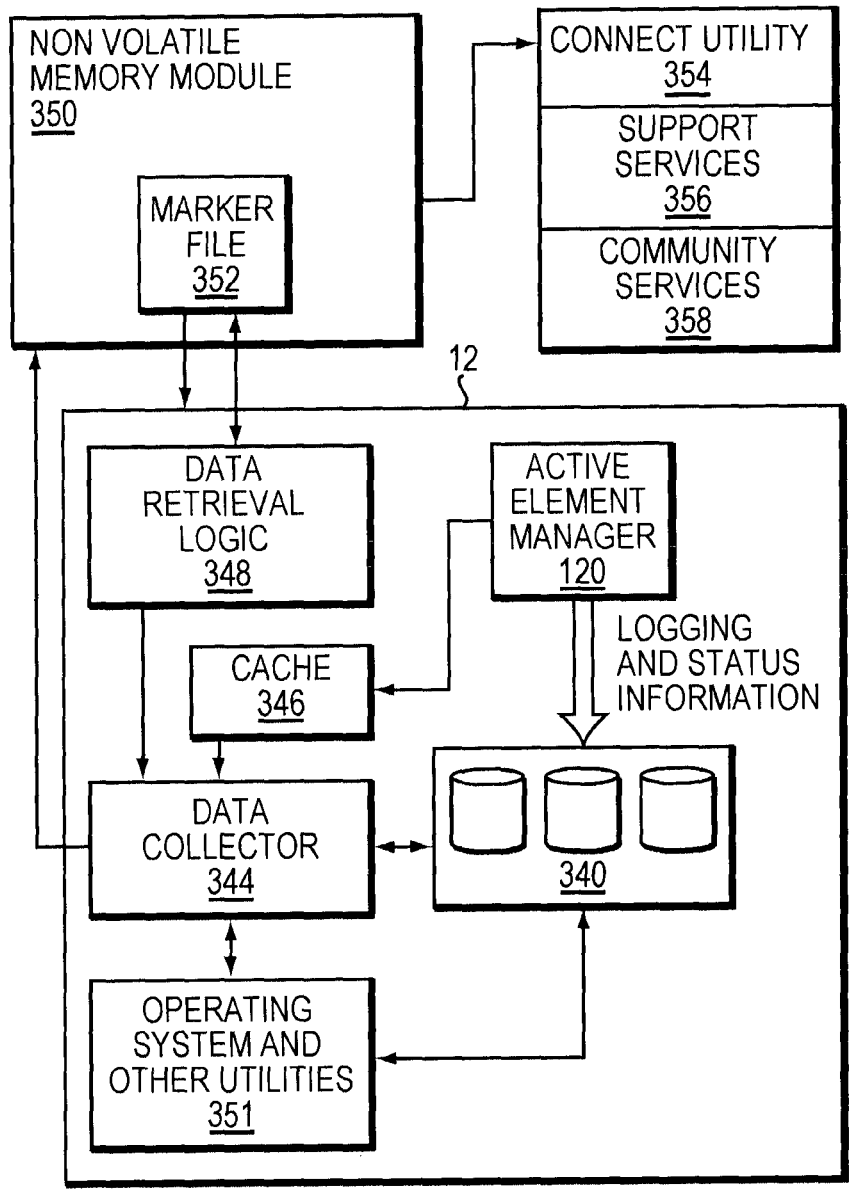

Referring to FIG. 6, shown is detailed representation of components that may be included in an embodiment using the techniques herein. The AEM 120 and components shown in FIG. 5 such as CAS layer 322, file system layer 324 and block storage layer 326 continuously logs information such as configuration data, status of commands issued from a remote user interface and error messages into a log file stored on a disk drive 340. Data Collector 344 is a utility that collects information logged by other components of the data storage system 12. Data collector 344 may also collect information such as system logs, memory dump generated by a failed process executing on the data storage system and information stored in cache 346 that may be useful in analyzing state of the data storage system 12 at the time of the failure. When nonvolatile memory module 350 (e.g., USB drive, USB flash drive) is connected to the data storage system 12, data retrieval logic 348 of the data storage system 12 detects that the nonvolatile memory module 350 is connected to the data storage system 12 and accesses information stored on the nonvolatile memory module 350. In at least some embodiments of the current technique, based on the information stored on the nonvolatile memory module 350, data retrieval logic 348 may initiate an action on the data storage system 12. One such action may be invoking data collector 344 utility that collects diagnostic data required to analyze a failure in the data storage system 12. Information stored on the nonvolatile memory module 350 may include marker file 352. A marker file is an empty file that is named in such a way that the name of the marker file holds a special meaning to the data storage system 12. The name of the file is recognized as a command by the data storage system 12. For example, the marker file named "copydata" may indicate to the data storage system 12 to copy data from the data storage system 12 to the nonvolatile memory module 350. Similarly, the marker file named "rundc" may indicate to the data storage system 12 to execute data collector utility 344 that collects diagnostic information such as system logs, configuration and status information, a memory snapshot of a failed process and a memory dump of the failed process. Additionally, nonvolatile memory module 350 may include other marker files such as "cleanup" and "safe reboot". Further, a marker file may also include an executable program containing programmable computer instructions that may be executed on the data storage system 12. The information copied on the nonvolatile memory module 350 by data collector utility 344 may be transferred to storage experts using an application such as Connect utility 354, support services application 356 and community services application 358 for further analysis and investigation of a failure in the data storage system 12. Additionally, storage system experts analyze the information copied on the nonvolatile memory module 350 for investigating a failure on the data storage system 12. The analysis of the information stored on the nonvolatile memory module 350 may also help in preventing further failures on the data storage system 12.

Figure 7:
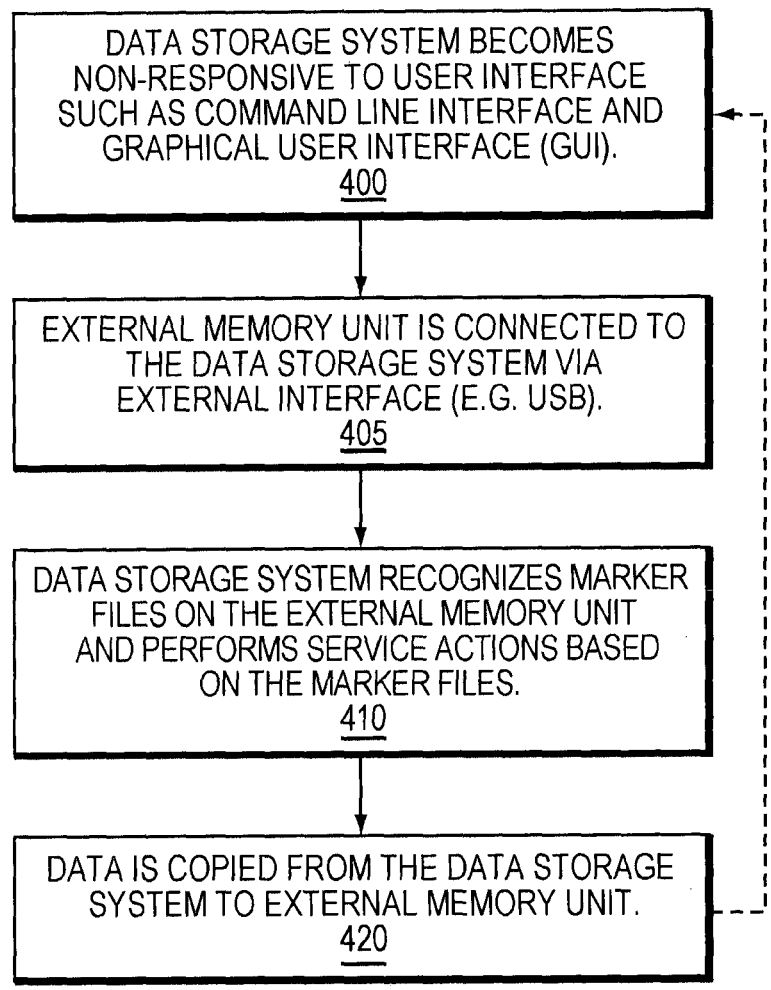
FIGS. 7-9 are flow diagrams illustrating processes that may be used in connection with techniques herein.

Referring to FIG. 7, shown is a flow diagram illustrating the method of retrieving data in data storage systems. With reference also to FIG. 6, the data storage system 12 may be unable to communicate with a remote user interface (e.g., command line interface, GUI) of a host system when a failure occurs either in a network connecting the host system to the data storage system 12 or in the data storage system 12 (step 400). A nonvolatile memory module 350 (e.g., USB drive, USB flash drive) is connected to the data storage system 12 for retrieving diagnostic data from the data storage system 12 (step 405). The data storage system 12 detects that the nonvolatile memory module 350 is connected to the data storage system 12. Further, the data storage system 12 detects marker file 352 stored on the nonvolatile memory module 350 (step 410). Marker file 352 initiates an action on the data storage system 12. Based on the information stored in the marker file 352, the data storage system 12 performs a service action. The service action may include collecting diagnostic information required to investigate the failure in the data storage system 12 and retrieving the diagnostic information from the data storage system 12 to the non-volatile memory module 350 (step 420).

Figure 8:
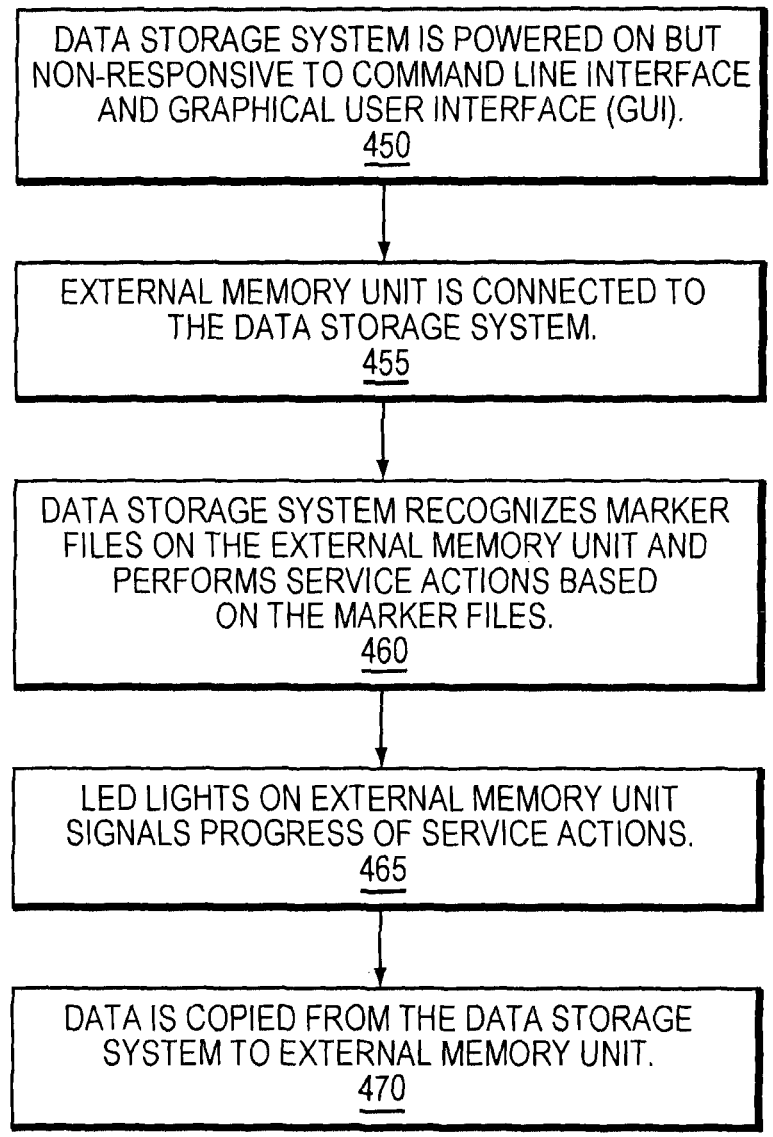

Referring to FIG. 8, shown is a more detailed flow diagram illustrating a flow of data in the data storage system. With reference also to FIG. 6, when a failure occurs in the data storage system 12, the failure may cause the data storage system 12 to function intermittently and the data storage system 12 may become non-responsive to a command issued by a user or an administrator from a remote user interface (e.g., command line interface, GUI) (step 450). A nonvolatile memory module such as a USB drive is connected to the data storage system 12 for retrieving diagnostic data needed to investigate cause of the failure (step 455). Data retrieval logic 348 of the data storage system 12 recognizes marker file 352 stored on the nonvolatile memory module and based on the information stored in the marker file 352, the data storage system 12 performs a service action (step 460). An LED display present on the nonvolatile memory module signals to the user progress of the service action performed by the data storage system 12 (step 465). For example, three blinks of LED lights on the LED display may indicate that the data storage system has started performing the service action, a steady display of LED lights on the LED display may indicate that the service action is being performed by the data storage system 12, and no LED lights on the LED display may indicate that the data storage system 12 has finished performing the service action. The service action may include invoking data collection utility 344 to collect diagnostic data and retrieving the diagnostic data collected by the data collection utility 344 from the data storage system 12 to the nonvolatile memory module 350 (step 470). The nonvolatile memory module may include more than one marker file and more than one service action may be initiated on the data storage system 12.

Figure 9:
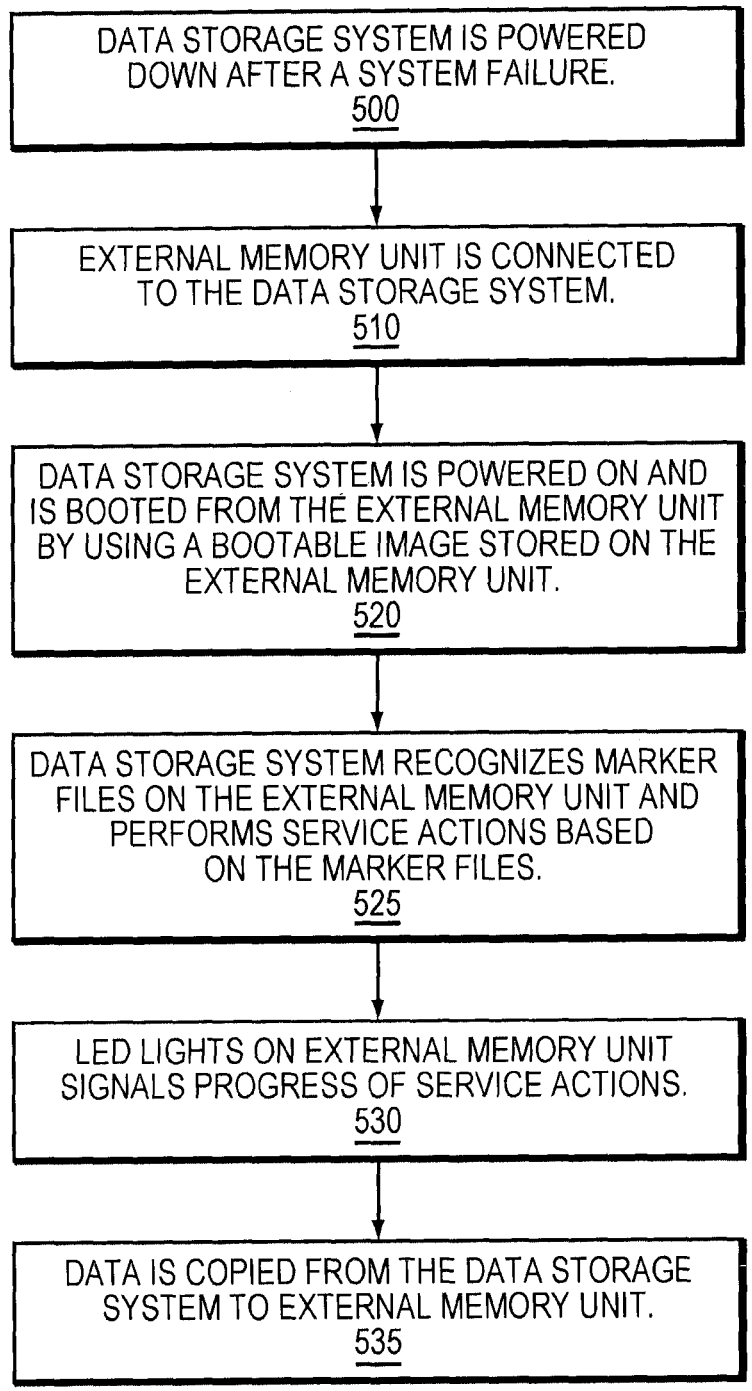

Referring to FIG. 9, shown is a more detailed flow diagram illustrating a flow of data in the data storage system. With reference also to FIGS. 3 and 6, data storage system 12 may be powered down when a failure occurs in the data storage system 12. Data storage system 12 may then become non-responsive to a command issued from a remote user interface (step 500). A nonvolatile memory module 350 (e.g., a USB drive, USB flash drive) is connected to connector 29 of the data storage system 12 (step 510). The nonvolatile memory module 350 may include a bootable image having a minimized version of an operating system that is sufficient to boot the data storage system 12. Nonvolatile memory module 350 may also include sufficient storage space to store diagnostic information copied from the data storage system 12. Further, the nonvolatile memory module 350 may include marker file 352 indicating a service action to be initiated on the data storage system 12 when the nonvolatile memory module is connected to the data storage system 12. A user or an administrator of the data storage system 12 connects the nonvolatile memory module 350 to the connector 29 of the data storage system 12 and powers on the data storage system 12 (step 520). The operating system of the data storage system 12 may be configured to run Basic Input/Output System (BIOS) instructions that may recognize the bootable image stored on the nonvolatile memory module 350 and may boot the data storage system 12 by using the bootable image stored on the nonvolatile memory module 350 (step 520). Data storage system 12 recognizes marker file 352 stored on the nonvolatile memory module 350 and performs a service action indicated by information stored in the marker file 525 (step 525). LED lights on the LED display of the nonvolatile memory module 350 indicates progress of the service action being performed by the data storage system 12 (step 530). If the data storage system 12 executes data collection utility 344, diagnostic data collected by data collection utility 344 is copied to the nonvolatile memory module 350 for further analysis by data storage system experts (step 535).

While the invention has been disclosed in connection with preferred embodiments shown and described in detail, their modifications and improvements thereon will become readily apparent to those skilled in the art. Accordingly, the spirit and scope of the present invention should be limited only by the following claims.

The invention claimed is:

1. A method for use in retrieving data from data storage systems, the method comprising:
    detecting a nonvolatile memory module connected to a data storage system, wherein the nonvolatile memory module is used for providing uninterrupted access to diagnostic information stored on the data storage system;
    evaluating a marker file stored on the nonvolatile memory module, wherein information associated with the marker file indicates an action to initiate on the data storage system; and
    based on the action indicated by the marker file, performing the action wherein the action includes automatically retrieving the diagnostic information from the data storage system to the nonvolatile memory module.

2. The method of claim 1, wherein the data storage system initiates the action based on the name of the marker file.

3. The method of claim 2, wherein the marker file includes a script file, wherein the script file performs an action on the data storage system.

4. The method of claim 1, wherein the nonvolatile memory module uses a flash memory.

5. The method of claim 1, wherein the nonvolatile memory module includes a USB drive.

6. The method of claim 5, wherein the USB drive includes a USB flash drive.

7. The method of claim 1, wherein the nonvolatile memory module is connected to the data storage system via an external connector mounted to the data storage system.

8. The method of claim 1, wherein the nonvolatile memory module includes an LED display.

9. The method of claim 8, further comprising:
    updating the LED display of the nonvolatile memory module for signaling to a user progress of the action performed by the data storage system.

10. The method of claim 1, further comprising:
    executing a data collection utility on the data storage system, wherein the data collection utility collects information on the data storage system.

11. A system for use in retrieving data from data storage systems, the system comprising a processor configured to:
    detect a nonvolatile memory module connected to a data storage system, wherein the nonvolatile memory module is used for providing uninterrupted access to diagnostic information stored on the data storage system;
    evaluate a marker file stored on the nonvolatile memory module, wherein information associated with the marker file indicates an action to initiate on the data storage system; and
    perform, based on the action indicated by the marker file, the action wherein the action includes automatically retrieving the diagnostic information from the data storage system to the nonvolatile memory module.

12. The system of claim 11, wherein the data storage system initiates the action based on the name of the marker file.

13. The system of claim 12, wherein the marker file includes a script file, wherein the script file performs an action on the data storage system.

14. The system of claim 11, wherein the nonvolatile memory module uses a flash memory.

15. The system of claim 11, wherein the nonvolatile memory module includes a USB drive.

16. The system of claim 15, wherein the USB drive includes a USB flash drive.

17. The system of claim 11, wherein the nonvolatile memory module is connected to the data storage system via an external connector mounted to the data storage system.

18. The system of claim 11, wherein the nonvolatile memory module includes an LED display.

19. The system of claim 18, further comprising:
    update the LED display of the nonvolatile memory module for signaling to a user progress of the action performed by the data storage system.

20. The system of claim 11, further comprising:
    execute a data collection utility on the data storage system, wherein the data collection utility collects information on the data storage system.

* * * * *